(12) United States Patent
Reimers et al.

(10) Patent No.: US 9,199,885 B2
(45) Date of Patent: Dec. 1, 2015

(54) UTILIZATION OF IRON SALTS TO STABILIZE AND/OR DISINFECT BIOSOLIDS

(71) Applicants: Robert S. Reimers, Houston, TX (US); Andrew J. Englande, Jr., Madisonville, LA (US); Norman K. Murray, Covington, LA (US); Yue Xu, New Orleans, LA (US)

(72) Inventors: Robert S. Reimers, Houston, TX (US); Andrew J. Englande, Jr., Madisonville, LA (US); Norman K. Murray, Covington, LA (US); Yue Xu, New Orleans, LA (US)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 0 days.

(21) Appl. No.: 14/215,952

(22) Filed: Mar. 17, 2014

(65) Prior Publication Data
US 2015/0000358 A1    Jan. 1, 2015

Related U.S. Application Data

(60) Provisional application No. 61/793,094, filed on Mar. 15, 2013.

(51) Int. Cl.
| | |
|---|---|
| C05F 7/00 | (2006.01) |
| C02F 11/14 | (2006.01) |
| C05G 3/00 | (2006.01) |
| C05D 9/02 | (2006.01) |

(52) U.S. Cl.
CPC . C05G 3/00 (2013.01); C02F 11/14 (2013.01); C05D 9/02 (2013.01); C05F 7/00 (2013.01); C02F 2303/02 (2013.01); C02F 2303/04 (2013.01); C02F 2305/00 (2013.01)

(58) Field of Classification Search
None
See application file for complete search history.

(56) References Cited

U.S. PATENT DOCUMENTS

| | | | | |
|---|---|---|---|---|
| 5,681,481 | A * | 10/1997 | Christy et al. | 210/723 |
| 6,752,849 | B2 * | 6/2004 | Logan et al. | 71/11 |
| 8,491,693 | B2 * | 7/2013 | Burnham | 71/11 |
| 8,557,013 | B2 * | 10/2013 | Burnham et al. | 71/11 |
| 2008/0034822 | A1 * | 2/2008 | Burnham et al. | 71/12 |
| 2008/0230484 | A1 * | 9/2008 | Burnham et al. | 210/710 |
| 2011/0154873 | A1 * | 6/2011 | Burnham et al. | 71/8 |

(Continued)

OTHER PUBLICATIONS

Asli S. Ciggin et al., "Respirometric Evaluation and Modelling of Acetate Utilization in Sequencing Batch Reactor under Pulse and Continuous . . . ", "Bioresource Technology", 2012, pp. 61-69, vol. 107, Publisher: Elsevier B. V., Published in: http://www.sciencedirect.com/science/article/pii/S0960852411017755.

(Continued)

Primary Examiner — Wayne Langel
(74) Attorney, Agent, or Firm — Eugene J. Molinelli; Beusse Wolter Sanks & Maire, PLLC

(57) ABSTRACT

In order to render sewage sludge suitable for beneficial purposes, it must be disinfected and stabilized. EDC deactivation is rapidly becoming a desirable result of any sludge or biosolids treatment process. Disclosed herein is a process of treating sewage sludge so as to stabilize the sludge that involves the presence of an iron-containing compound during dewatering of the sludge. Process embodiments described also achieve biosolid samples that have reduced EDC activity, Other embodiments disclosed involve use of a combination of iron salts ferrate and ferric chloride that are added to wastewater sludge in the dewatering step before heat drying. The biosolids resulting from sludge treated with aniron-containing compound are able to resist putrefaction for more than two to three weeks.

27 Claims, 19 Drawing Sheets

(56) References Cited

U.S. PATENT DOCUMENTS

| | | | |
|---|---|---|---|
| 2012/0034286 A1* | 2/2012 | Zhang | 424/405 |
| 2014/0150507 A1* | 6/2014 | Burnham | 71/8 |
| 2014/0223979 A1* | 8/2014 | Wiseman et al. | 71/13 |
| 2015/0191399 A1* | 7/2015 | Dahms et al. | 71/12 |

OTHER PUBLICATIONS

Richard R. Dague, "Fundamentals of odor control", "Journal Water Pollution Control Federation", 1972, pp. 583-594, vol. 44, No. 4, Publisher: Water Environment Federation, Published in: http://www.jstor.org/discover/10.2307/25037426?uid=3739256&uid=2129&uid=2134&uid=2483073417&uid=2&uid=70&uid=3&uid=2483073407&uid=60&sid=2110454111056.

A. S. Eikum & B. Paulsrud, "Methods for measuring the degree of stability of aerobic stabilized sludges", "Water Research", 1977, pp. 763-770, vol. 11, No. 9, Publisher: Elsevier B. V., Published in: http://www.sciencedirect.com/science/article/pii/0043135477900446.

National Risk Management Research Laboratory, "Control of Pathogens and Vector Attraction in Sewage Sludge (EPA/625/R-92/013)", "Environmental Regulations and Technology", 2003, pp. 1-186, Publisher: U.S. Environmental Protection Agency, Published in: Cincinnati, OH.

Enzo Favoino, "Improving the C Cycle: Biological Tratment of Biowaste in the Light of International Environmental Drivers", May 10-12, 2006, pp. 1-35, Publisher: International Solid Waste Association working group Biological Treatment, Published in: Perugia, Italy.

Gea, Teresa, et al, "Monitoring the biological activity of the composting process: Oxygen uptake rate (OUR) . . . ", "Biotechnology & Bioengineering", 2004, pp. 520-527, vol. 88, No. 4, Publisher: John Wiley & Sons, Inc., Published in: http://onlinelibrary.wiley.com/doi/10.1002/bit.v88:4/issuetoc.

Iannotti, D. A., et al., "A quantitative respirometric method for monitoring compost stability", "Compost Science and Utilization", 1993, pp. 52-65, vol. 1, No. 3, Publisher: Taylor & Francis Group, Published in: http://www.tandfonline.com/doi/pdf/10.1080/1065657X.1993.10757890#.U_O0amOTF20.

Marsili-Libelli, S., et al., "Accuracy analysis of a respirometer for activated sludge dynamic modelling", "Water Research", 2002, pp. 1181-1192, vol. 36, No. 5, Publisher: Elsevier B. V., Published in: http://www.sciencedirect.com/science?_ob=ShoppingCartURL&_method=add&_eid=1-s2.0-S0043135401003396&_ts=1408480601&md5=056503a8efd7c52262e95ffe0f17e578.

Scaglia, B., et al., "Precision determination for the specific oxygen uptake rate (SOUR) method used for biological stability evaluation . . . ", "Bioresource Technology", 2007, pp. 706-713, vol. 98, No. 3, Publisher: Elsevier B.V., Published in: http://www.sciencedirect.com/science/article/pii/S0960852406000472.

Skaggs, B., "Utilization of ferrate as a disinfection technology for wastewater reuse", "Ph.D. dissertation", 2013, pp. 1-295, Publisher: Tulane University, Published in: New Orleans, LA.

Srisawat, Ponsawat, "Deactivation of Endocrine-Disrupting Compounds in Wastewater by Ferrate (VI) Oxidant", "Ph.D. dissertation", 2012, Publisher: Tulane University, Published in: New Orleans, LA.

Switzenbaum, M. S., et al., "Defining Biosolids Stability", "Journal of Environmental Engineering", 1997, pp. 1178-1184, vol. 123, No. 12, Publisher: American Society of Civil Engineers, Published in: http://ascelibrary.org/doi/abs/10.1061/%28ASCE%290733-9372%281997%29123%3A12%281178%29.

Yue Xu, Robert S. Reimers, & Andrew J. Englande, "Development of Heat-Dried Biosolids Product for Application in the Wetlands", "Symposium on Biosolids Advances on Biosolids Stabilization and Disinfection (conference presentation)", 2013, pp. 1-20, Publisher: Water Environment Federation Specialty Conference Disinfection and Public Health, Published in: Indiana, US.

Yue Xu, Robert S. Reimers, Andrew J. Englande & Mary A. Sandberg, "Development of Heat-Dried Biosolids Product for Application in the Wetlands", "WEFTEC (conference presentation)", 2013, pp. 1-35, Publisher: Water Environment Federation, Published in: Chicago, IL.

Deniz Yurtsever et al., "Comparison of Gasification, Pyrolysis and Incineration Technologies for Residuals Management: Future of Advanced . . . ", "Residuals and Biosolids 2009", 2009, pp. 80-91, Publisher: Water Environment Federations, Published in: Alexandria, VA.

* cited by examiner

| No. | Reaction | Rate constant |
|---|---|---|
| 1 | $Fe(II) + O_2 \rightarrow Fe(III) + O_2^{\cdot-}$ | $78\ M^{-1}\ s^{-1}$ |
| 2 | $Fe(II) + O_2^{\cdot-} + 2H^+ \rightarrow Fe(III) + H_2O_2$ | $1.0 \times 10^7\ M^{-1}\ s^{-1}$ (1) |
| 3 | $Fe(II) + H_2O_2 \rightarrow Fe(III) + OH^{\cdot} + OH^-$ | $3.1 \times 10^4\ M^{-1}\ s^{-1}$ (1) |
| 4 | $O_2^{\cdot-} + H^+ \rightarrow HO_2^{\cdot}$ | $5.0 \times 10^{10}\ M^{-1}\ s^{-1}$ (2) |
| 5 | $HO_2^{\cdot} \rightarrow O_2^{\cdot-} + H^+$ | $7.9 \times 10^5\ s^{-1}$ (2) |
| 6 | $O_2^{\cdot-} + HO_2^{\cdot} + H^+ \rightarrow H_2O_2 + O_2$ | $9.7 \times 10^7\ M^{-1}\ s^{-1}$ (2) |
| 7 | $SMP + OH^{\cdot} \rightarrow SMP' + O_2^{\cdot-}$ | $6.6\ (g/L)^{-1}\ s^{-1}$ |
| 8 | $Fe(III) + O_2^{\cdot-} \rightarrow Fe(II) + O_2$ | $1 \times 10^6\ M^{-1}\ s^{-1}$ |

| Parameters | Mean | St. D. | Number of Samples |
|---|---|---|---|
| TS (%) | 5.3 | 0.64 | 12 |
| VS (%) | 2.8 | 0.25 | 12 |
| $TOC_{total}$ | | | |
| % | 1.0 | 0.2 | 12 |
| mg/L | 10040 | 1818 | 12 |
| $TOC_{liquid}$ | | | |
| % | 0.008 | 0.0001 | 12 |
| mg/L | 79.02 | 9.9 | 12 |
| pH | 6.8 | 0.4 | 12 |
| ORP (mV) | -166.1 | 14 | 12 |

Figure 4

| Parameters | Mean | St. D. | Number of Samples |
|---|---|---|---|
| TSS (%) | 1.19 | 0.09 | 3 |
| VSS (%) | 0.63 | 0.08 | 3 |
| $TOC_{total}$ | | | |
| % | 0.33 | 0.02 | 3 |
| mg/L | 3314 | 242 | 3 |
| $TOC_{liquid}$ | | | |
| % | 0.01 | 0.005 | 3 |
| mg/L | 101 | 47 | 3 |
| pH | 8.2 | 0.01 | 3 |
| ORP (mV) | -87 | 0.01 | 3 |

Figure 5

| Ferrate as Iron/TS (mg/Kg) | (%) | Moisture | Buffer | Feed | Seed | SOUR (mg $O_2$/h/g TS) | pH | ORP (mV) | Number of Samples |
|---|---|---|---|---|---|---|---|---|---|
| 12 | 1.2 | 98.5% | N | N | N | <1.5 (10-70h) | 10.6 | -154 | 3 |
| 13 | 1.3 | 99%, 98% | Y | Y | Y | >1.5 (0-5h); ≈1.5 (5-25h) | 7.8 | -168 | 3 |
| 24 | 2.4 | 98.5% | N | N | N | <1.5 (10-70h) | 10.6 | -154 | 3 |
| 49 | 4.9 | 98.5% | N | Y | Y | <1.5 (0-67h) | 10.6 | -154 | 3 |
| 49 | 4.9 | 98.5% | N | N | N | <1.5 (10-70h) | 10.6 | -154 | 3 |

Figure 7

| FeCl₃ as Iron/TS (mg/Kg) | (%) | Moisture | Buffer | Feed | Seed | SOUR (mg O₂/h/g TS) | pH | ORP (mV) | Number of Samples |
|---|---|---|---|---|---|---|---|---|---|
| 14 | 1.4 | 99% | N | N | Y | >1.5 (0-10h); <1.5 (10-48h) | 5.3 | -120.3 | 3 |
| 15 | 1.5 | 98%, 99% | Y | Y | Y | >1.5 (0-5h); <1.5 (5-18h) | 7.7 | 23.4 | 3 |
| 18 | 1.8 | 98% | N | N | Y | <1.5 (0-24h) | 7.3 | 74.2 | 3 |
| 20 | 2.0 | 99% | N | N | Y | >1.5 (0-10h); <1.5 (10-48h) | 7.3 | 74.2 | 3 |
| 23 | 2.3 | 90% | N | N | Y | <1.5 (0-48h) | 6.6 | -201.3 | 3 |
| 31 | 3.1 | 90% | N | N | Y | <1.5 (0-48h) | 6.6 | -201.3 | 3 |

Figure 10

| FeCl$_3$ as Iron/TS (mg/Kg) | (%) | Moisture | Buffer | Feed | Seed | SOUR (mg O$_2$/h/g TS) | pH | ORP (mV) | Number of Samples |
|---|---|---|---|---|---|---|---|---|---|
| 9 | 0.9 | 98% | N | N | N | <1.5 (0-90h) | 7.2 | 93.8 | 3 |
| 13 | 1.3 | 98% | N | N | N | <1.5 (0-24h) | 7.2 | 99.9 | 3 |
| 15 | 1.5 | 98% | N | N | N | <1.5 (0-24h) | 7.4 | 15.4 | 3 |
| 19 | 1.9 | 98% | N | N | N | <1.5 (0-24h) | 7.4 | 15.4 | 3 |
| 20 | 2.0 | 98% | N | N | N | <1.5 (0-24h) | 7.3 | 74.2 | 3 |
| 22 | 2.2 | 98% | N | N | N | <1.5 (0-90h) | 7.2 | 99.9 | 3 |

Figure 12

| Ratio (Ferric Chloride/Ferrate) | Impact on Dewaterability | Recommendation |
|---|---|---|
| 1:2 | Not able to dewater | Not recommended |
| 2:1 | Not able to dewater | Not recommended |
| 5:1 | Hard to dewater, very slimy context | Not recommended |
| 10:1 | Better outcome than ratio (5:1), Iron color showing in supernatant | Not recommended, need to look into the reason color showed |
| 20:1 | Excellent enhancement | Recommended, more precise ratio between 20:1 and 30:1 |
| 30:1 | Excellent enhancement | Recommended, more precise ratio between 20:1 and 30:1 |

Figure 13

| Sample | Moisture | Buffer | Feed | Seed | SOUR (mg $O_2$/h/g TS) | pH | ORP (mV) |
|---|---|---|---|---|---|---|---|
| Municipal Sludge Ash | 98% | Y | N | Y | <1.5 (0-24h) | 7.3 | 131.3 |

Figure 14

| Samples | EDCs concentration (as ng E2/g solid) | ORP (mV) Mean | Std. | pH Mean | Std. |
|---|---|---|---|---|---|
| Sludge Cake | 82.10 | -166.1 | 14.0 | 6.8 | 0.2 |
| Incinerator Ash | -34.18 | ND | ND | ND | ND |
| Wetland #1 | 5.31 | 108.9 | 37.5 | 7.9 | 0.7 |
| Wetland #2 | -0.10 | 28.9 | 70.3 | 7.8 | 0.3 |
| Wetland #3 | 20.71 | 63.0 | 7.6 | 8.1 | 0.6 |
| Wetland #4 | 9.98 | 29.4 | 82.0 | 7.7 | 0.6 |
| Wetland #5 | 51.52 | 1.8 | 57.8 | 8.0 | 0.8 |
| Wetland #6 | -44.44 | 63.0 | 35.0 | 7.5 | 0.4 |
| Wetland #7 | 33.39 | 63.0 | 10.3 | 8.1 | 0.4 |
| *Range of wetland* | (-44.44, 51.52) | (1.8, 108.9) | | (7.5, 8.1) | |

Figure 15

| Ferrate as Iron/TS (mg/Kg) | (%) | Moisture | Buffer | Feed | Seed | SOUR (mg $O_2$/h/g TS) | pH | ORP (mV) |
|---|---|---|---|---|---|---|---|---|
| 13 | 1.3 | 99%, 98% | Y | Y | Y | >1.5 (0-5h); <1.5 (5-25h) | 7.8 | 168 |

| FeCl$_3$ as Iron/TS (mg/Kg) | (%) | Moisture | Buffer | Feed | Seed | SOUR (mg $O_2$/h/g TS) | pH | ORP (mV) |
|---|---|---|---|---|---|---|---|---|
| 15 | 1.5 | 98% | Y | Y | Y | >1.5 (0-5h); <1.5 (5-18h) | 7.7 | 23.4 |

Figure 18

| Iron/TS (%) | $ORP_{prior}$ (mV) | $ORP_{post}$ (mV) |
|---|---|---|
| 1.3 (Ferrate) | -168.0 | 93.1 |
| 1.5 (Ferric Chloride) | -159.0 | 89.2 |

Figure 19

| Pollutant | $T_{1/2}$ | Product |
|---|---|---|
| Hydrogen Sulfide | 2.7 msec | Sulfate |
| Thioacetamide | 0.4 sec | Acetamide, Sulfate |
| Thiourea | 0.6 sec | Urea, Sulfate |
| Cyanide | 5.3 sec | Cyanate, Nitrite, Bicarbonate |
| Thiocyanate | 1.7 min | Cyanate, Nitrite, Sulfate |
| Nitrite | 37 min | Nitrate |
| Ammonia | 196 min | Nitrate, Nitrite, Nitrogen |

UTILIZATION OF IRON SALTS TO STABILIZE AND/OR DISINFECT BIOSOLIDS

CROSS-REFERENCES TO RELATED APPLICATIONS

This application is related to U.S. Provisional Application No. 61/793,094 filed Mar. 15, 2013 to which priority is claimed under 35 USC 119. The full disclosure of this provisional is incorporated by reference.

STATEMENT REGARDING FEDERALLY SPONSORED RESEARCH

Not Applicable.

COMPACT DISK SUBMISSION

Not Applicable.

BACKGROUND OF THE INVENTION

1. Field of the Invention

The present invention relates to disinfected and/or stabilized biosolids and a novel method of producing disinfected and/or stabilized biosolids, using a combination of iron salts and heat drying.

2. Description of Related Art

The treatment of wastewater treatment plant residuals to create value-added products is fast becoming a reality as a result of public opinion and regulatory concerns. This mandate has given impetus to developing innovative approaches for municipal waste residuals treatment based on possible end uses and recycling modes, such as commercial fertilizer, sediment amender for dredge sediment for wetlands and remediation of lead contaminated soils.

This movement is facilitated by advances in solids processing, including incineration, co-generation of biosolids treatment, heat dried biosolids, advanced alkaline stabilization, innovative chemical or thermophilic processes (which ensure disinfection), stabilization and the destruction/biodegradation of refractory organics. These treated municipal waste residuals may be further treated to produce a value-added product that reduces or eliminates pre-existing or perceived liability.

The method disclosed in the present invention allows these tested value-added products to move beyond the criteria developed in the United States Environmental Protection Agency (EPA) 503 regulations, which originated from research conducted in the 1970s and 1980s.

According to 40 CFR 503, biosolids must be stabilized prior to land application in order to reduce pathogens, odors, potential putrefaction processes, and vector attraction concerns. Over the past ten years, several short-term and long-term stabilization techniques have been developed. Long-term stabilization is obtained when the readily degradable organics are decomposed. Processes currently recognized as capable of obtaining long-term stabilization are limited to the biological processes, such as aerobic digestion, anaerobic digestion, composting, lagoon storage and pile storage. Physical and chemical treatment processes, such as acid treatment, alkaline stabilization, and heat drying, are currently delineated as short-term stabilization processes that only inhibit the putrefaction process. With acid- and alkaline-stabilized biosolids, long-term storage may yield odors and attract pests, and pathogen regrowth can occur. Windrow alkaline composting of these biosolids types can result in long-term stabilization and reduced vector attraction.

The indicators used to determine whether biosolids have been treated adequately to achieve stabilization depend on the method of stabilization used and the grade of the biosolids desired. Treated biosolids are divided into Class A and Class B biosolids on the basis of pathogen reduction as determined by microbiological testing. Other assessment methods are used to demonstrate adequate reductions in vector attraction and odor control, such as the specific oxygen uptake rate (SOUR), percent volatile suspended solids (VSS) reduction, and the carbon dioxide release rates. Limited bench-scale experiments on sludges treated with both acid and alkaline systems have noted biosolids stability, as measured by decreased SOUR and reduced VSS. VSS reductions in the acid system ranged between 56% and 74%, which is comparable to the reduction of degradable organics, yet a total solids reduction was not appreciable due to some precipitation of calcium sulfate.

The respiration procedures involve carbon dioxide respiration and oxygen uptake rates traditionally associated only with biological processes. The use of biochemical oxygen demand ($BOD_5$) as a surrogate for SOUR gives a better assimilation of biological stabilization. $BOD_5$ is a powerful tool in assessing the organic strength of biosolids, indicating the amount of oxygen required for biological degradation. The correlation of the $BOD_5$ with the SOUR measured by respirometry provides an average stability instead of a batch assessment, as shown in FIG. 1. The results of these tests are reported as mg/L oxygen consumed per gram dry weight biosolids per hour. Carbon dioxide respiration and oxygen uptake rates are based on the current protocols used to assess compost stability. The Compost Stability Index is based on the level of microbial activity in a sample, determined by monitoring respiration (mg CO2-C/g compost carbon/day).

Stability is, among all the characteristics of sludge, possibly the most difficult one to measure; it can include the entire set of characteristics making the disposal of sludge acceptable. Although there has yet to be a definition of stability with one to two parameters, several aspects have been agreed upon: odor should not be released, vector attraction reduction should be achieved and pathogen reduction should be achieved as prescribed in the 503 regulations.

The concept is difficult to standardize and generalize because stability is associated with a specific location and disposal method. Stability of sludge is generally linked to the putrefaction potential or the tendency of organic matter to biodegrade. The stabilization process is considered as controlled decomposition of easily degradable organic matter resulting in a significant reduction of volatile solids content, a change of an unpleasant smell, and reduction of pathogens. In a WEF/ASCE report, researchers used the level of volatile solids reduction in a sludge stabilization process as the indicator of its performance. It is also recommended that respirometric methods be used to measure biodegradable organic matter content and the stability of the sludge. Compared to other stabilization degree measurements, few studies have been conducted on the respirometric investigation of sludge stabilization.

Overdosing the sludge with iron raised concerns about iron toxicity towards the receiving environment. A study assessing the transformation of iron species in activated sludge membrane bioreactors showed that, although the total iron concentration in engineered biological systems is much higher (e.g., typically over 100 mM in feed streams to activated sludge treatment plants) than in many natural systems (e.g., concentrations of 0.1e9 nM are typical of marine systems), the concentration of iron in solution and available for biological uptake is likely to be similar since, in both instances, under oxic conditions at circumneutral pH values, the thermodynamically favored ferric iron (Fe(III)) is highly insoluble with the concentration of dissolved inorganic Fe(III) species on the order of 10-11 M. Thus, there is less concern about effluent or supernatant generated from iron-added sludge.

A respirometry method has been developed for measuring the oxygen uptake rate of a given sample, either liquid or solid, in a closed system with ample oxygen supply. This design is also able to measure the biogas production of a sample under anoxic or anaerobic conditions, which are usually maintained by purging the closed system of oxygen with nitrogen gas before testing. Researchers have used biological stability to determine to what extent readily biodegradable organic matter has decomposed. Respirometry can also detect if the biosolids exhibit any toxicity toward certain receiving environments, particularly wetland.

A method to assess biological stability must numerically represent the actual point reached in the process of decomposition through the use of a measurement on a recognized scale of values, which enables the comparison of different decomposition processes. One definition of stability that has been offered is the extent to which readily biodegradable organic matter has decomposed; this definition allows for an analysis of the efficiency of waste treatment. Other biochemical parameters, such as volatile suspended solids (VSS), total and dissolved organic carbon (TOC, DOC) and chemical oxygen demand (COD) have been used to monitor the progress of biological treatments. However, when analyzing heterogeneous materials, these parameters lack precision because of the presence of non-biodegradable volatile or oxidizable materials. The use of biological activity measurements as a measure of biodegradable organic matter content or stability has been widely suggested and experimented upon in recent decades. Aerobic respirometric techniques and methanogenic activity assays have been proposed and seem most appropriate.

In the last decade, most of the respirometric applications were to monitor composting; few looked into biological reactor performance. Several indices derived from actual readings have been created and are applicable to a number of different sample matrices: oxygen uptake rate (OUR), respirometric index (RI), and respiratory quotient (RQ). OUR has traditionally been used in aerobic processes to estimate real-time biological activity, and it is broadly used in the field of wastewater treatment. When the same technique is applied to composting material, OUR is often referred to as the dynamic respiration index (DRI). When DRI is estimated off-line and without continuous aeration, the static respiration index (SRI) can be obtained that determines compost stability. Respiration methods that measure OUR are considered the most reliable to determine biological stability because of the ability of OUR to numerically represent the point when readily biodegradable organic matter has been decomposed to a certain level during a stabilization process.

Respirometry has been used as an indicator for biomass inhibition or stimulation by testing endogenous respiration rates without adding oxygen or substrate. Results indicated that the addition of iron-based chemicals, i.e., ferric chloride and ferrous sulphate, did not stimulate the biomass during dosing. OUR increased when iron(II) was added but not iron (III); however, improved biological treatment was not observed with the addition of iron(II), so stimulation was not indicated.

The most useful indicator of sludge stability is its odor, although odor measurement is notoriously difficult. The utilization of a dynamic olfactometer which can be calibrated to individual odor sensitivity is a commonly used technique to measure odor intensity. The most frequent cause of odor concerns is $H_2S$. The conditions that lead to its production also are beneficial to the growth of other odorous organic compounds. Strong offensive gases associated with raw sludges usually disappear during the first stage of the stabilization process. This is consistent with practical experience since aerobic stabilization usually does not create offensive odors at the treatment plant. High oxygen uptake rates are usually associated with high odor intensity index during the stabilization process.

Recent studies indicate the potential widespread occurrence of estrogenic compounds and other organic wastewater contaminants and their metabolites in the environment. Estrogenic compounds include steroid hormones and their metabolic by-products, oral contraceptives and alkylphenols. Both naturally-occurring estrogenic compounds and estrogen-mimicking compounds may have a role in the disruption of normal endocrine functions. The EPA defines endocrine disrupting chemicals (EDCs) as "exogenous agents that interfere with the production, release, transport, metabolism, binding, action or elimination of the natural hormones in the body responsible for the maintenance of homeostasis and the regulation of developmental processes." EDCs and other organic wastewater contaminants and their metabolites are continually introduced into the environment, and the long-term effects of continuous, low-level exposure on ecosystems and human health are not well understood. Based upon the recognition of the potential scope of the problem, the possibility of serious effects on the health of populations, the persistence of some endocrine-disrupting agents in the environment and widespread global concerns, the EPA has identified EDC research as one of six high priority topics. Further, the World Health Organization has identified exposure to endocrine disrupting chemicals as an emerging global environmental concern.

A relatively high percentage of estrogen compounds, including estradiol, estrone and estriol, is expected to partition into the biological suspended solids in activated sludge due to their low aqueous solubility and moderately hydrophobic character (log $K_{ow}$ 2.6-4.0). Biosolids treatment processes therefore may represent a significant sink for estrogenic compounds. In a recent study, samples collected at various stages of treatment showed that 51%-67% of the estrogenic activity in the influent wastewater was removed by wastewater and biosolids treatment processes. Approximately 5%-10% of the estrogenic activity was associated with the processed biosolids. An increase in estrogenic activity was reported as treatment progressed in aerobic and anaerobic digestion processes. The degradation of some compounds, such as conjugated hormones, may result in greater estrogenic activity in the products of these processes than in the parent compounds. In another study, an increase in natural estrogen concentrations was reported in the water and sludge phases from a mesophilic anaerobic digester in a municipal sewage treatment plant. Despite these findings, there is little information available regarding the fate of estrogenic compounds during various phases of solids processing such as thickening, aerobic digestion, anaerobic digestion, lime stabilization, chemical conditioning, dewatering, drying and composting. These earlier studies show the potential of increased estrogenic activity in treated biosolids and subsequent risk of entry to the environment. Therefore, the effects of specific sludge treatment processes on estrogenic activity in biosolids must be assessed.

Processes that can disinfect and control vector attraction along with deactivating EDCs and pharmaceuticals and personal care products (PPCPs) will become preferred biosolids treatment processes. In the Ferrate Advanced Alkaline Stabilization/Disinfection process, ferrate reacts with these EDCs and PPCPs. Recently, the oxidation of hormonal estrogens, estrone (E1), 17β-estradiol (E2), and 17α-ethynylestradiol (EE2) by ferrate was studied. The results suggest that hormonal estrogens can be effectively removed by oxidation with ferrate(VI). Complete removal was obtained at a molar ratio of ferrate(VI) to estrogens of about 3.0 in water samples at pH 9.0.

Biosolids derived from municipal wastewater treatment are frequently used for beneficial purposes, such as land application to improve agricultural soils. Organic pollutants can partition into sludge during primary or secondary treatment and reenter the environment during biosolids reuse. Further, the occurrence of EDC contaminants in biosolids applied to land is a growing global environmental concern. An understanding regarding the fate of estrogenic compounds and estrogenic activity during solids processing therefore is important in assessing environmental and human health risks and formulating best management practices.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. No feature of the invention is critical or essential unless it is expressly stated as being "critical" or "essential."

BRIEF SUMMARY OF THE INVENTION

Embodiments of the present invention provides a method of producing stabilized and/or disinfected biosolids. In accordance with this discovery, one embodiment provides a process, using a combination of iron salts and heat drying, to stabilize and disinfect biosolids and/or sludge.

Embodiments also pertain to the resultant biosolids that have been stabilized and/or disinfected. Stabilized and/or disinfected biosolids can be used in beneficial applications, including wetland restoration.

Stabilized biosolids produced by methods herein have increased resistance to putrefaction. Stabilized biosolids are able to resist putrefaction for at least about 2, 3, 4, 5, and 6 weeks.

BRIEF DESCRIPTION OF THE DRAWINGS

FIG. 2 shows model reactions involved with iron and their oxidants or reductants.

FIG. 3 shows characteristics of condensed municipal sewage sludge from New Orleans POTW.

FIG. 4 shows characteristics of municipal return activated sludge (RAS) from New Orleans' POTW.

FIG. 5 shows the SOUR results of ferrate additions.

FIG. 7 shows the SOUR results of ferric chloride additions (seeded).

FIG. 10 shows the SOUR results of ferric chloride additions (not seeded).

FIG. 12 shows the optimum ratio of ferric chloride to ferrate.

FIG. 13 shows characteristics of municipal sludge ash.

FIG. 14 shows EDC assessment results of sludge cake, incinerator ash and sediments from New Orleans wetlands.

FIG. 15 shows SOUR results of ferrate additions and ferric chloride additions.

FIG. 18 shows prior and post treatment ORP readings.

FIG. 19 shows the reaction time and products of ferrate reactions with selected pollutants in sediments.

Definitions

Figure 1:
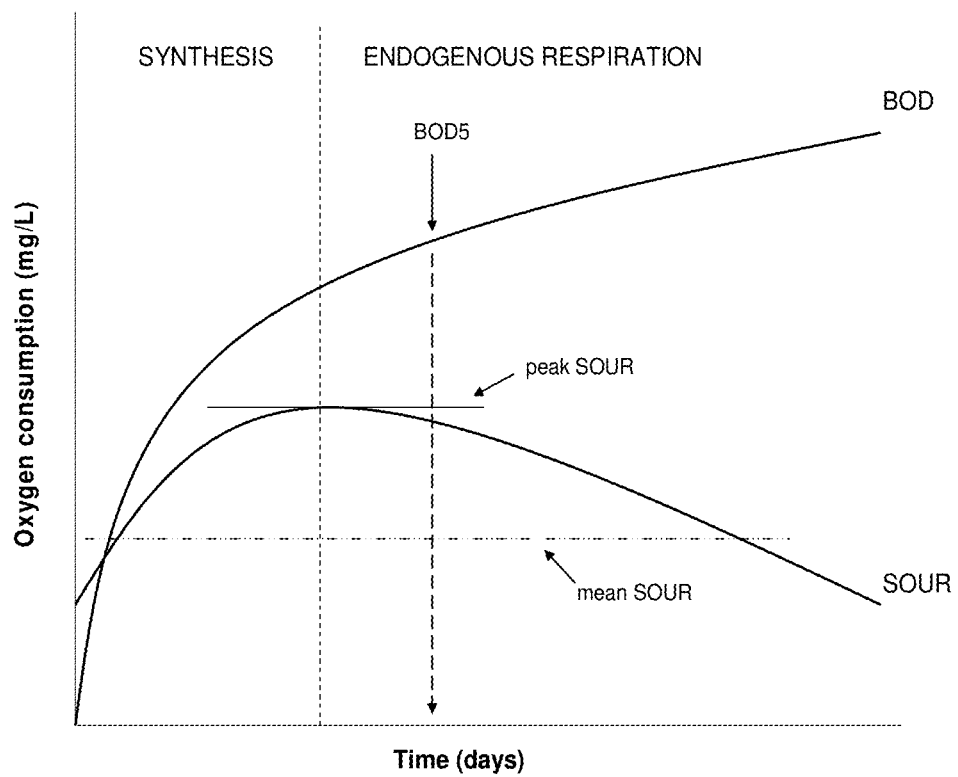
FIG. 1 shows the biochemical oxygen demand (BOD) and specific oxygen uptake rate (SOUR) over time.

The term "iron-containing compound" as used herein refers to a compound that comprises iron and which typically produces ferric hydroxide in an aqueous environment at a certain pH. Examples of iron-containing compounds include, but are not limited to, an iron salt such as that provided in Appendix A, inorganic iron, or ferrate, or combinations thereof. Typically, the iron-containing compound is an iron salt, such as a ferric halide (e.g. ferric chloride, ferric bromide, ferric iodide, etc.) or ferric sulfate, or ferrate, or a combination thereof.

The term "dewatering" as used herein refers to a process that separates solids and liquid in wastewater sludge (sludge). Dewatering is typically, but not necessarily, a physical (mechanical) unit operation used to reduce the moisture content of sludge so that it can be handled and/or processed as semisolid instead of as a liquid. Dewatering can involve known devices including, but not limited to, filters (e.g. Rotary Vacuum filters), centrifuges (e.g. disk centrifuge, basket centrifuge, solid-bowl centrifuge, etc.), or continuous belt filter presses (CBFP). Other examples of dewatering involve lagoons or drying beds.

The term "biosolid cake" as used herein refers to a biosolid containing material produced from dewatering sludge that typically involves reducing the moisture content from 100% down to about 75% to about 85%.

The term "heat-drying" as used herein refers to the application of heat to biosolids, typically biosolid cake, for purpose of evaporating water and reducing water content of the biosolids. In the example of biosolid cake, heat-drying, reduces moisture content to about 5% to about 25%. In a specific example, moisture content achieved with heat drying is about 10% to about 20%. Heat-drying is typically conducted using a heat-drying device such as a direct or indirect rotary heat-dryer, combination direct-indirect rotary dryer, microwave dryer, or direct or indirect disc dryer, or other devices known in the art for heat drying biosolid cake.

DETAILED DESCRIPTION

Detailed descriptions of one or more exemplary embodiments are provided herein. It is to be understood, however, that the present invention may be embodied in various forms.

Therefore, specific details disclosed herein are not to be interpreted as limiting, but rather as a basis for the claims and as a representative basis for teaching one skilled in the art to employ the present invention in any appropriate manner.

In one embodiment, provided is a method of stabilizing and/or disinfecting biosolids using iron salts and heat drying.

In another embodiment, provided is disinfected and/or stabilized biosolids for use in beneficial applications.

In another embodiment, provided is a process to produce disinfected and/or stabilized biosolids.

Another embodiment disclosed pertains to a method for the treatment of sewage sludge containing solids that involves dewatering the sewage sludge in the presence of an iron-containing compound to a produce biosolid cake, wherein said iron-containing compound is provided at about 1% to about 10% of the solid content of the sewage sludge; and heat-drying the biosolid cake to produce a biosolid sample that is stabilized. The presence of the iron-containing compound in the sludge, resulting biosolid cake, or biosolid sample provides an unexpected stabilization not previous contemplated. In a more specific embodiment, the amount of iron containing compound is about 1% to about 5% of the solid content of the sewage sludge. In an even more specific embodiment, the amount of the iron containing compound is about 1.5% to about 2.3% of the total solids content of the sewage sludge.

An alternative embodiment involves adding a combination of ferrate and ferric chloride to wastewater sludge in the dewatering step before heat drying. The instability of ferrate is substantiated by the deactivation of EDCs in the sludge and the disinfection of the sludge and wastewater effluent. SOUR results are used to measure the stability and disinfection of the treated sludge. The biosolids resulting from sludge treated with ferric chloride are able to resist putrefaction for more than two to three weeks. The ORP values in the treated biosolids indicate that ferric chloride dosage is optimal at about 2.3% iron to dry weight cake.

The present invention discloses the use of iron-based chemicals in combination with a heat drying process to stabilize the sludge to render it suitable for wetland application. One possible iron-based chemical is ferrate iron, $FeO_4^{2-}$, usually easily degradable even in caustic solutions due to its high oxidation potential. A study assessing the ability of ferrate oxidation to improve alachlor biodegradability stated that ferrate ($FeO_4^{2-}$,) is the strongest of all the oxidants used for remediation. Ferrate ions can be reduced to non-toxic insoluble Fe(III) species, which can adsorb organic compounds and remove them from solution. Recently, considerable attention has been paid to its dual functions of oxidation and coagulation to treat wastewater. The pH values of the ferrate solutions were critical. Ferrate ions possess good aqueous stability in high pH solution but have a low redox potential. The high redox potential resulting from low pH value solutions improves the reactivity of ferrate. Consequently, it is critical to control the initial pH to between about 6.5 and 8.5 to make full use of the ferrate oxidation process in wastewater treatment.

Ferrate is a high strength oxidant on the order of hydroxide radicals (mixed oxidants) that will oxidize sulfur and amine compounds within seconds to minutes and may also readily destroy EDCs and PPCPs. This process looks to be good candidate for residuals treatment for beneficial reuse, but may be utilized as a disinfection and tertiary treatment process for the reuse of secondary wastewater effluent in California, Florida and Texas and other places where freshwater is not readily available.

An analysis of the solubility of iron species concluded that the solubility of iron, which is potentially related to its bioavailability, can be increased by either formation of dissolved Fe(III) complexes with biologically-produced ferric ligands strong enough to prevent Fe(III) precipitation (typically known as siderophores) or by reduction of ferric species, including those present as insoluble Fe(III) oxyhydroxides, by biologically-generated reductants to the much more soluble ferrous (Fe(II)) form. If oxygen is present, these Fe(II) species will be thermodynamically unstable and will be oxidized back to the Fe(III) form. However, Fe(II) oxidation kinetics generally are reasonably slow in the circumneutral pH range, leading to the result that elevated steady-state concentrations of Fe(II) species may exist, as shown in FIG. 2.

In the present invention, using a lagoon treatment in which the oxic condition readies the biosolids for wetland application, Fe(II) could be higher than normal, even though the heat drying process could tilt the reactions more toward Fe(III). It is difficult to predict the state of Fe(II), but once the biosolids are released from the lagoon, there are more opportunities for the Fe(II) to encounter oxygen. These opportunities, in combination with the slightly lower than 7.0 pH value that is common in wetlands, mean that Fe(II) will be easily oxidized into insoluble Fe(III) and will not cause toxicity.

Experimental

Optimization for Sewage Sludge Stabilization

While the addition of ferric chloride has been utilized in conditioning sewage sludge for dewatering, its potential to stabilize has not been verified previously. The present invention optimizes the ability of ferric chloride to treat sewage sludge from New Orleans East Bank Public-Owned Treatment Works (POTW). Because of the unique properties of sewage sludge, the dosage of ferric chloride was determined based on total solids content for every batch of sample. Respirometry tests were conducted to assess stability, measuring both specific oxygen uptake rate in aerobic conditions and gas production in anaerobic situations.

According to a previous study, the lowest dose that provides effective stability is 2% of total solids content. The optimized dose was ascertained by using the lowest dose and contact time required to achieve a SOUR reading lower than 1.5 mg $O_2$/h/g TS or gas production lower than 2 mg $CH_4$/h/g TS. Ferric chloride is commercially available, while ferrate was synthesized on-site. The ferrate synthesis method is disclosed in U.S. Pat. No. 6,790,429, herein incorporated by reference in its entirety.

Thickened and return activated sludge samples were collected in 0.5-L sanitized brown bottles with Teflon-lined lids and kept at 4° C. while transporting and before experimentation, and were tested on the same day. The required minimum sample volume was 0.4 liter for solids analysis. A number of parameters were measured in order to characterize the thickened and return activated sludge, including total solids (TS)/total suspended solids (TSS), volatile solids (VS)/volatile suspended solids (VSS), total organic carbon (TOC), pH and ORP value.

Thickened sewage sludge was poured into sterile 2-L Phipps & Bird B-Ker polycarbonate jars with a sampling port for flash mixing and flocculation in amounts of 1 L to 2 L. The ferric chloride/ferrate dose was delivered by syringe to the jar test beakers. The ferric chloride dose was calculated by obtaining the total solids content of the sludge sample first and taking 2% of the result. The ferrate dose was calculated after computing the final synthesized concentration of ferrate in buffer solution. Both the ferrate and ferric chloride doses were based on mass rather than volume. The ferrate solution strength was calculated based on mass instead of volume to minimize errors in the dose calculations; these errors are associated with off-gases from the ferrate solution changing the volume of ferrate within the syringe. Of the six jars, one jar of raw sludge served as the control and five jars were used to test various dosages. The ferric chloride was added first while the sludge samples were mixed at a speed of 300 rpm; after thorough mixing (about 10 minutes), the ferrate was added and the mixture was mixed at 300 rpm for about 10 minutes until thoroughly mixed. Well-mixed sludge was then transferred into centrifuge tubes and centrifuged, and then the settled solids were collected and spread on a baking pan and heat dried for about 30 minutes.

Characterization of Sewage Sludge and Respirometry Assessments

Once the optimum dose and ratio of ferric chloride and ferrate were ascertained, the nature of sewage sludge was analyzed to determine its physical and chemical parameters and to measure the stability of chemical-dosed heat-dried sewage sludge using the respirometer. This analysis is used to determine the feasibility and scale-up dosages for stable biosolids. Untreated sewage sludge and treated sewage sludges were assessed using the respirometer.

Batch respirometer tests were conducted by dosing microbial culture with an amount of organic chemical or wastewater followed by monitoring the reactions through measurement of oxygen uptake in aerobic tests or gas production in anoxic and methanogenic tests. Batch tests are transient, non-steady-state reactions in which both substrate and biomass concentrations change throughout the biodegradation reaction. The procedures generally involve the following steps. A sample of wastewater or solution of test chemicals is placed in each of a number of respirometer vessels. Nutrients and trace minerals are added in amounts sufficient to support biological growth and a buffer is added to maintain the pH within an acceptable range. A seed culture is added to provide microorganisms that can degrade the organic constituents in the test samples. A caustic scrubber is suspended within the headspace of the reaction vessel to absorb carbon dioxide (only in instruments using headspace oxygen transfer), and chemicals are added to inhibit nitrification in cases where only aerobic carbonaceous oxidation reactions are to be monitored. The reaction vessels are attached to a device suitable for measuring oxygen uptake or gas production, and oxygen uptake or gas production is measured over time periods ranging from a few minutes to 90 days, depending on the test objectives.

The aerobic conditions of respirometry assessments were designed to simulate the scenario that the treated biosolids were fully seeded with an unlimited oxygen supply. The anaerobic conditions mimicked fully seeded biosolids without oxygen. The return activated sludge from the New Orleans' POTW was used as seed for its already acclimated microorganisms. For the same reasons, the effluent was selected as the dilution water to increased moisture content.

The characteristics of raw sludge were assessed to ascertain any influence on ferric chloride and ferrate addition. These include TS and VS (settled sludge) or TSS and VSS (return activated sludge), TOC (solids and filtrates), pH and ORP value, and $BOD_5$ if necessary.

Both the settled sludge and return activated sludge were collected in 1 L polyethylene bottles at the New Orleans Eastbank POTW on the morning of testing. Settled sludge was collected before the addition of any polymers. Filled sampling bottles were placed in a cooler with ice packs to temperately suspend and preserve the microorganisms in the sample. Upon arriving at the laboratory, return activated sludge was brought back to ambient temperature and aerated until it was used as seed. The aeration maintained the microbial populations in the sample and reduced them to their endogenous state so the process of seeding did not provide any additional feed in the respirometry system.

Aerobic: Specific Oxygen Uptake Rate

Aerobic microorganisms consuming either organic substrates or reduced inorganics demand oxygen uptake, which makes SOUR an excellent parameter for monitoring aerobic heterotrophic/autotrophic reactions. These reactions also produce carbon dioxide, so an additional carbon scrubber in the closed system is crucial.

After the heat drying process, the product was tested for total solids contents. Based on the results, a 2% solution of said product in effluent was made and poured into 600 mL narrow neck glass bottles, along with a seeding of 3000 mg/L for each bottle. The system was then sealed and set up in a 20° C. water bath for real time monitoring on oxygen uptake for 96 hours. pH and ORP values were assessed at the beginning and the end of the tests.

Endocrine Disrupting Activity

Ferrate has been quite effective in deactivating EDCs in wastewater, but its effectiveness on sludge was previously untested. Two types of analytical protocols were utilized: a recombinant yeast estrogen screen (YES) assay and a MVLN human cancer cell line assay. Prior to these assays, all treated biosolids were subjected to a three step methylene chloride/methanol extraction to extract the EDCs from the solids. Certain amounts of dry biosolids resulting from the heat drying process are packed with polymers in a metal extraction tube. An extraction machine exposed the tube to high pressure and elevated temperature and allowed the addition of methylene chloride and methanol. The resulting liquid was blow dried by nitrogen gas and then reconstituted in DMSO for the YES assay, and in ethanol for the MVLN assay. All glassware was soaked in Alconox for four hours, soaked in Contrad70 for four hours, soaked in 10% nitrate acid for 24 hours, rinsed with deionized water, and baked in a 450° C. oven for four hours.

YES Assay and MVLN Assay

The YES assay was carried out using recombinant strains of the yeast *Saccharomyces cerevisiae* in pre-sterilized 96-well microtiter plates (Fisher, Pa., USA). Each plate contained triplicate extracted samples that are serially diluted, E2 standard solution series (ligand for ER), negative control (deionized water used in extraction), and a solvent blank (DMSO). The concentrations of E2 standard in the serially diluted wells covered the range of concentrations of tested samples so the linear portion of the E2 standard curve could be used to calculate E2-equivalence levels in samples.

The plates were sealed with Parafilm to prevent evaporation and were incubated at 30° C. for 18 hours. The cells were re-suspended in the 96-well plate, a certain amount was removed from each well and transferred to a new 96-well plate and Z buffer was added. Sterile plates are not necessary in this step. A timer was started and the new plate was placed in a 37° C. water bath until a yellow color showed. Each reaction was timed and stopped with a 1 M sodium carbonate solution. The 96-well assay plate was read at a wavelength of 405 nm using the spectrophotometer to quantitate the yellow-colored nitrophenol product. This extraction protocol was also used for the MVLN assay; however, ethanol was used as the reconstituting solvent.

The calculation of lacZ units for the YES assay is as follows.

$$((OD_{405} \text{ of lacZ assay sample well} - \text{background} \\ OD_{405})*1000)/((\text{amount of time in minutes for} \\ \text{assay to produce yellow color}*\text{volume of cells} \\ \text{added to well in mL})*(OD)_{600} \text{ of lacZ assay} \\ \text{sample well} - \text{background } OD_{600})$$

Results and Discussion

Stability of Heat Dried Municipal Biosolids

Tests were conducted on sludge with $FeCl_3$ and $FeO_4^{-2}$ at doses of 10, 50, 100 and 200 mg/Kg dry weight of biosolids. Preliminary assessments of sludge samples (n=12) are shown in FIG. 3.

The thickened sludge contained around 5.30±0.6% of total solids and 2.80±0.3% of volatile solids. Total organic carbon measurements of sludge and supernatant were 10,040 mg/L and 79 mg/L respectively. The pH values remained neutral, 6.8 with 0.4 of variance. The ORP values were in the range of −166±14 mV. The negative numbers are expected since there was foul odor emitting from the sludge.

Because the return activated sludge (RAS) was used as seed in the respirometry tests, the same parameters (n=3) were also tested in the return activated sludge. The results are shown in FIG. 4. RAS had lower TSS and VSS, 1.19% and 0.63% respectively. It also contained lower TOC of 3,314 mg/L in total and 101 mg/L in supernatant. The pH value was higher than that of thickened sludge, 8.2, and the ORP value was higher, −87 mV.

The sludge was thickened to achieve a 5% solids content level. After the addition of ferric chloride, ferrate or both followed by centrifugation, the sludge cake was placed in an oven at 80° C. for 30 minutes to mimic the heat drying process. The dried sludge was then tested for stability by adding 98%-99% of moisture content. There were three exogenous variables: buffer, feed and seed. The buffer was 1.5M $KH_2PO_4$ at pH 7.0. The feed was acetate acid and the microbial seed was RAS, which was aerated from the moment samples reached the lab until it was applied to the respirometric system. The cake was buffered to pH=7.0.

To assess the ability of heat drying process to produce stable Class A biosolids as determined by VSS and SOUR reduction, stability was determined by measuring VSS, SOUR, pH, ORP and $BOD_5$ of raw sludge after treatment with and without ferrate and ferric chloride. The SOUR results of ferrate and ferric chloride addition are displayed in FIGS. 5 through 11.

The results of the initial ferrate runs noted no stabilization at 1.3% ferrate as the iron dose. This is shown in FIG. 5. The other runs indicate a pH higher than 10. When the respirometry tests were not neutralized with the buffer, the various dosages ranging from 1.2% to 4.9% all generated stable biosolids, even when acetate and seed had been added. The sludge was stabilized not due to the addition of the iron but by the pH itself since ferrate has a very strong alkalinity.

Figure 6:
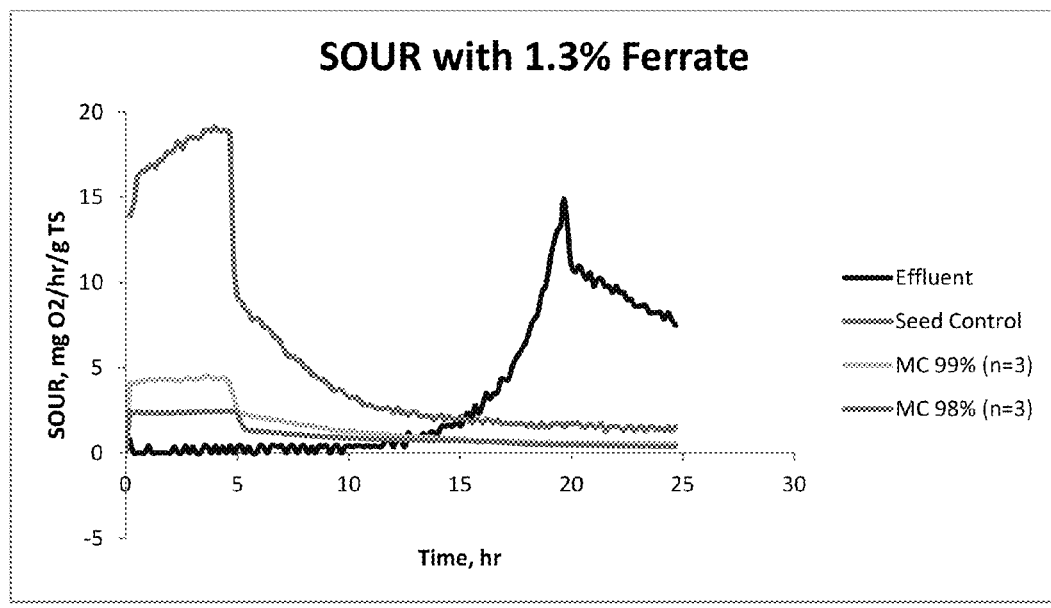
FIG. 6 shows a graph of the SOUR results with 1.3% ferrate, with buffer, seed and feed in the respirometer.
Figure 8:
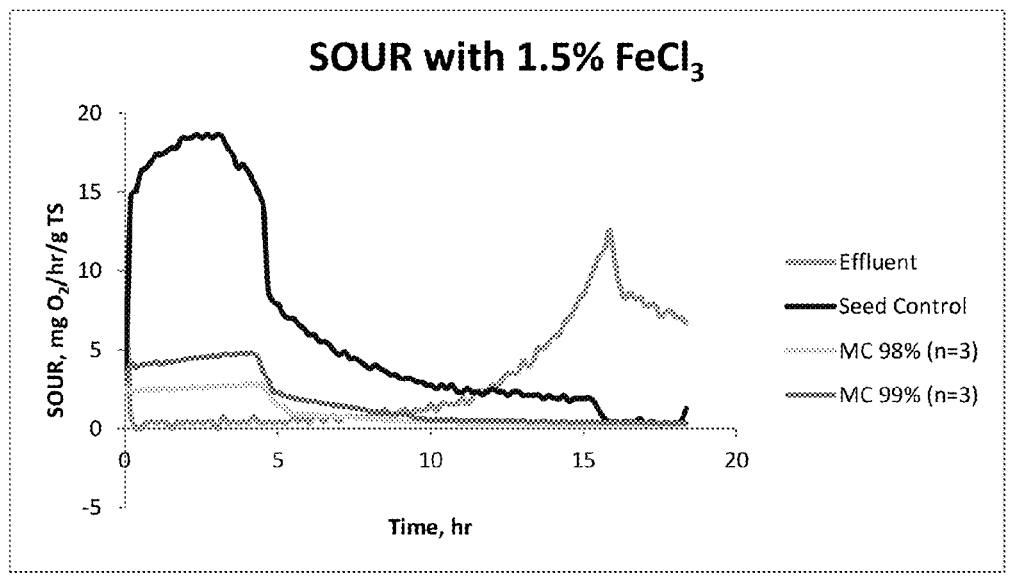
FIG. 8 shows a graph of the SOUR results with 1.5% ferric chloride, with buffer, seed and feed in the respirometer.

When dosed with 1.5% ferrate as the iron dose by TS, two moisture contents (MC) were tested in the respirometer. Both showed inhibited oxygen demand, which fell even lower when the substrate was consumed. FIG. 6 demonstrates that SOUR did not reach below the stable criteria requirement until hour 5 and 9, respectively for MC at 98% and 99%.

At doses of 1.4% to 1.5% ferric chloride, the heat-dried biosolids were not stable as the SOUR results showed values larger than 1.5 mg $O_2$/h/g TS for 5 to 10 hours when seeded. This can be seen in FIGS. 7 and 8. Ferric chloride addition at 1.5% inhibited the activity of bacteria after the exogenous nutrients had been consumed after five hours. The pH values were neutral without buffering, which could be the influence of heat drying process.

Figure 9:
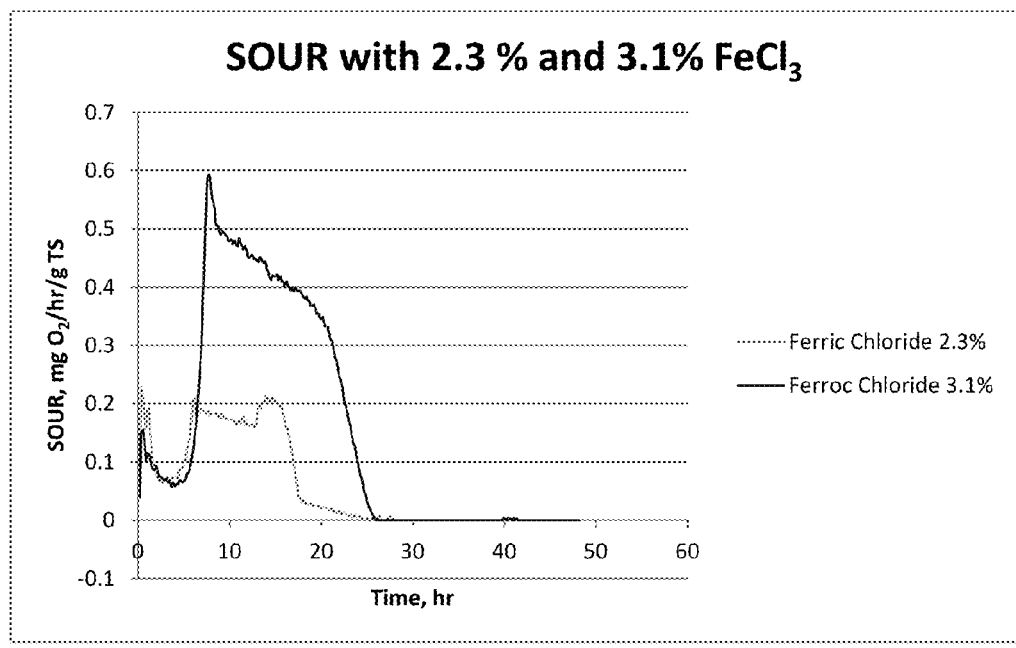
FIG. 9 shows a graph of the SOUR results with 2.3% and 3.1% ferric chloride, with a moisture content of 90% and only seed in the respirometer.

At dose larger than 2.3% ferric chloride, the heat-dried biosolids were observed to be stable for at least 2 days. This is shown in FIG. 9. As expected, when not seeded, the heat-dried biosolids were stable. The biosolids were pasteurized and the microbes were inactivated. This phenomenon was also noted at a 2% dose of ferric chloride, as shown in FIG. 10.

Figure 11:
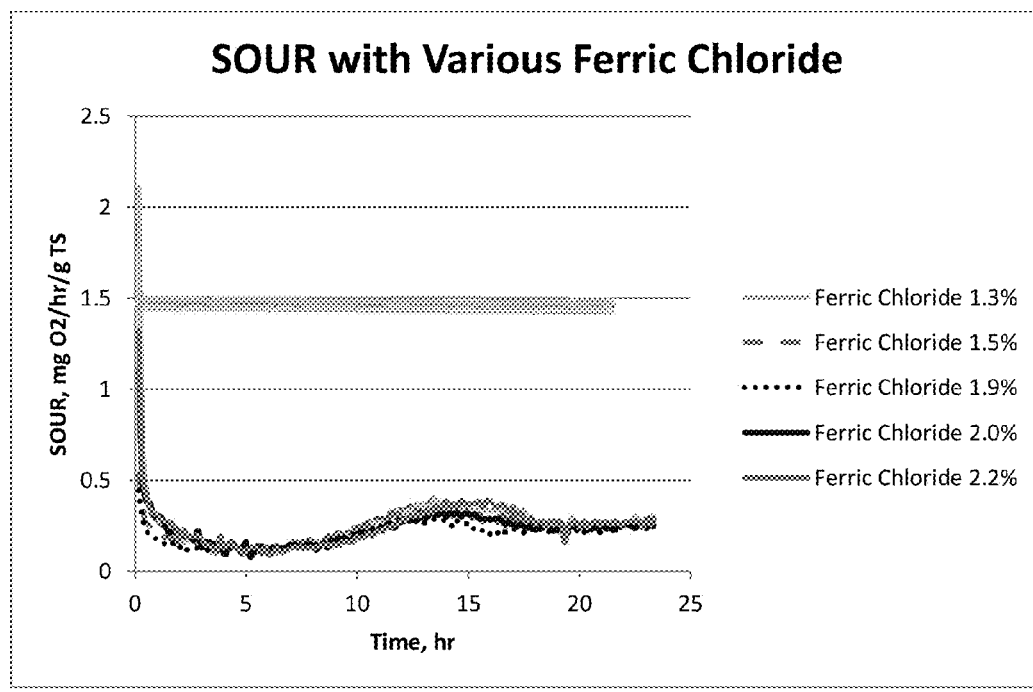
FIG. 11 shows a graph of SOUR results with various concentrations of ferric chloride, with no buffer, seed or feed in the respirometer.

FIGS. 10 and 11 indicate that the ferric chloride-treated heat-dried biosolids were stable when seed was not added, and with the addition of seed, the treated heat-dried biosolids were not stable at ferric chloride doses less than 2.3%.

Ferrate, unlike ferric chloride, lacks coagulating ability for municipal sludge, so the optimum ratio of two iron-based salts for the best dewaterability output was determined. The results are shown in FIG. 12. The ferrate may be applied along with ferric chloride, since ferrate causes disinfection and EDC deactivation, and ferric chloride induces iron to react with sulfide and maintains the ORP at a level high enough for odor elimination.

Incinerator ash was tested for stability; it is stable as shown in FIG. 13. The microbes were eliminated by the incineration process. Because the ash is very stable, it can be utilized as a wetlands soil amender. The high temperature during incineration exhausted the biologically available matters for putrefaction to occur even when the samples were seeded with RAS. The temperature in the heat drying process was 80° C., which achieved pasteurization yet preserved the nutrients. Without microbes, the biosolids reached stability in the first 24 hours and maintained it for up to 90 hours.

FIG. 14 showed the EDC concentrations obtained by MVLN assays on untreated sludge cake and incinerator ash form New Orleans POTW. The measurements of grab samples from local wetland were also included. It should be noted that the New Orleans raw sludge cake had EDC activity close to that seen in wetland sediments. However, the ORP values of the sludge cake were about 200 mV below those of the sediment samples due to the high organic contents of the cake.

Stability by Iron-based Salts Addition

The sludge was assessed for stability and estrogenic activity with the application of iron-based salts and the heat drying process. The concentration of ferrate applied to the sludge was 1,250 mg/L. The municipal sludge had a TOC of 10,000 mg/L, and the ratio of TOC/ferrate was 8.0, which is two times the level effective for disinfection. In biosolids, the ferrate is very unstable and will decompose within one minute to ferric hydroxide. The decomposition of ferrate occurs in wastewater effluents of TOC concentrations of 6 mg/L to 20 mg/L, with ferrate doses of 6 mg/L to 12 mg/L (maximum TOC/ferrate=3.3). The TOC concentrations for the municipal sludge are in the range of 1% at 10,000 mg/L, meaning that the ferrate will not be stable at a dosage of 1,250 mg/L.

Respirometry Assessments

Figure 16:
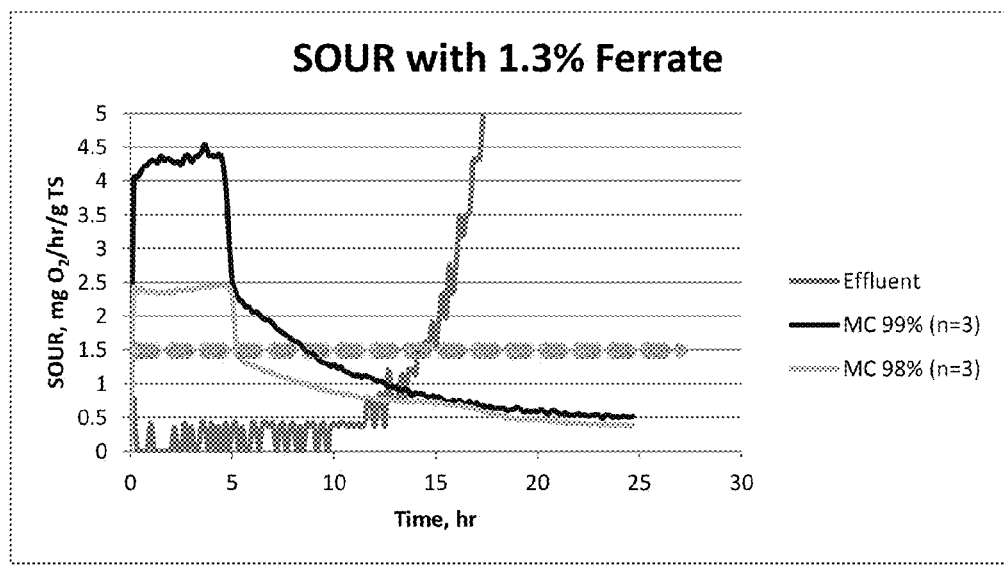
FIG. 16 shows a graph of SOUR results of heat-dried biosolids with a 1.3% ferrate dose expended, with buffer, seed and feed in the respirometer.
Figure 17:
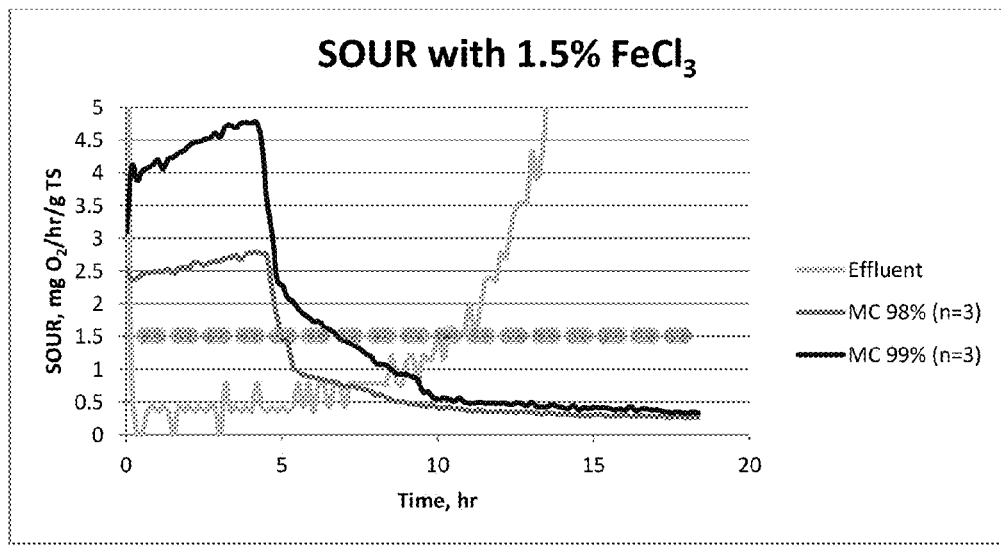
FIG. 17 shows a graph of SOUR results of heat-dried biosolids with a 1.5% ferric chloride dose expended, with buffer, seed and feed in the respirometer.

Regardless of the testing conditions, the SOUR of each batch tended to go beyond 1.5 mg $O_2$/h/g TS, possibly due to headspace or ferrous chemical influences. Seed control demanded higher oxygen uptake rate than biosolids with seed, which could be explained by the toxicity of biosolids towards seed, which is unlikely, or by the higher solids content of seed with biosolids that rendered the SOUR smaller. This can be illustrated by the results shown in FIG. 15. The results in FIGS. 16 and 17 are similar for both ferrate and ferric chloride. Therefore, $FeCl_3$ appears to be a stabilization agent.

The dried biosolids were diluted 100 to 1 and the cake was seeded with RAS. Even so, the cake appeared to be stable up to approximately 4 days. The testing conditions were intended to mimic the worst case scenario, so it is likely that under more realistic conditions, the cake would be stable for much longer than 4 days.

When dosed with 1.5% ferrate as iron by TS, two moisture contents (MC) were tested in the respirometer. Both showed inhibited oxygen demand, which dropped even lower when the substrate was consumed. FIG. 16 indicates that SOUR did not reach below the limit requirement until hour 5 and 9, respectively for MC at 98% and 99%. These results are highly consistent with a similar dosage of ferric chloride as iron, as FIG. 17 indicates.

ORP Buffer Effect of Iron

The addition of ferric chloride generates ferric hydroxide and acts as an electron buffer that holds the ORP of the heat-dried biosolids between 10 mV and 200 mV. This buffering capacity is shown by the ORP values of half reactions below.

$$Fe^{3+}+e^-=Fe^{2+}\ E_R^0=0.77V$$

$$Fe(OH)_3+3H^++3e^-=Fe^{3+}+3H_2O\ E_R^0=1.06V$$

$$FeO_4^{2-}+4H_2O+3e^-=3Fe(OH)_4+4OH^-\ E_R^0=0.72V$$

As shown in FIG. 18, both ferric chloride and ferrate will hold the ORP levels in the biosolids to around 0.1 V. This electron buffer enables the heat-dried biosolids to resist a drop of ORP to below −300 mV. Thus, the cake will resist going into methonagenesis, which would cause sulfide production.

Odor Control by Iron Reaction with Sulfide

Ferric/ferrous salts have been applied for odor control in collection systems since the 1970s due to their reactivity with sulfide. The $Fe^{3+}$ will precipitate sulfide at a high level where the $K_{sp}$ for $Fe_3S_2$ is $10^{-88.0}$. Fe(III) oxidizes sulfide to elemental sulfur in solution with pH values ranging from 0.88 to 1.96 at ambient temperature. The following reactions show the oxidation process.

$$S^{2-}+2H^+\rightarrow H_2S$$

$$H_2S+2Fe^{3+}\rightarrow S_0+2Fe^{2+}+2H^+$$

The reduced Fe(II) can subsequently produce FeS precipitant, as the following reaction shows.

$$Fe^{2+}+HS^-\rightarrow FeS+H^+$$

Under the anoxic conditions that the treated heat-dried biosolids would be stored in before use for any beneficial purpose, sulfide could precipitate with heavy metals to form insoluble metal sulfides, such as iron sulfide. The form of sulfide in the wetland pore water can vary from $S^{2-}$ to $HS^-$ and $H_2S$ depending on the pH. Low pH systems have a propensity to off gas $H_2S$ with its accompanying rotten egg odor. The addition of iron and the use of iron-rich soil matrix have been reported to control the dissolved sulfide concentration. FIG. 19 shows the products of ferrate reactions with selected pollutants in sediments, including sulfide.

EDC Deactivation and Degradation

EDC concentrations detected previously in wetland varied from ~44.44 ng E2/g to 51.52 ng E2/g solids. Compared to the EDC concentrations found in incinerator ash and raw sludge cake, there was no significant difference. The data indicate that the heat-dried biosolids with the addition of ferric chloride and/or ferrate appear to have deactivated EDCs.

Ferrate and ferric chloride were added to municipal sludge in the dewatering step before a heat drying process at 80° C. for 30 minutes. The ferrate was instable in the sludge cake, leading to the deactivation of EDCs and the disinfection of the wastewater effluent. The optimum dosage for ferric chloride was found to be at least about 2.3% iron/total solids of sludge by weight or greater, and the optimum dosage for ferrate was found to be at least about 1.5% iron/total solids of sludge by weight. A ratio of ferric chloride to ferrate of between 10:1 and 30:1 was found to be optimal. The iron-treated, heat-dried biosolids resist putrefaction for over 5-6 days under a worst-case scenario with moisture content of 98% to 99% and microbial seeding. The heat drying inactivated vegetative microbes because the process simulates pasteurization. Therefore, it is likely that these iron-treated, heat-dried biosolids could resist putrefaction for more than 2-3 weeks. Odor emission is reduced due to the high affinity of the ferric hydroxide to sulfide and thiocompounds. These iron-treated, heat-dried biosolids are thus stabilized and disinfected, rendering them suitable for use in beneficial purposes, such as wetland restoration.

It should be borne in mind that all patents, patent applications, patent publications, technical publications, scientific publications, and other references referenced herein are hereby incorporated by reference in this application in order to more fully describe the state of the art to which the present invention pertains.

Reference to particular buffers, media, reagents, cells, culture conditions and the like, or to some subclass of same, is not intended to be limiting, but should be read to include all such related materials that one of ordinary skill in the art would recognize as being of interest or value in the particular context in which that discussion is presented. For example, it is often possible to substitute one buffer system or culture medium for another, such that a different but known way is used to achieve the same goals as those to which the use of a suggested method, material or composition is directed.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A method for the treatment of sewage sludge containing solids, comprising:

(a) dewatering the sewage sludge in the presence of an iron-containing compound to produce biosolid cake, wherein said iron-containing compound is provided at about 1% to about 5% of the solid content of the sewage sludge; and (b) heat-drying the biosolid cake to produce a stabilized biosolid sample;

wherein the dewatering is conducted at a pH of 6.5 to 8.5 such that the iron-containing compound produces ferric hydroxide.

2. The method of claim 1, wherein the amount of iron-containing compound is about 1.8% to about 2.3% of the total solids content of the sewage sludge.

3. The method of claim 1, wherein the iron-containing compound is an iron salt or ferrate.

4. The method of claim 3, wherein the iron salt is ferric chloride or ferric sulfate.

5. The method of claim 1, wherein the stabilized biosolid sample comprises reduced EDC activity.

6. The method of claim 1, wherein the biosolid cake is thickened to about 75% to about 85% moisture content.

7. The method of claim 1, wherein the stabilized biosolid sample is thickened to about 5% to about 25% moisture content.

8. The method of claim 1, wherein dewatering comprises subjecting the sewage sludge to centrifugation or filtration, or a combination thereof.

9. The method of claim 1, wherein the heat-drying comprises using an application of heat via a heat-dryer device.

10. The method of claim 9, wherein the biosolid cake is dried using an application of heat of about 80° C.

11. Dried, disinfected biosolids as produced by claim 1, wherein the dried, disinfected biosolids comprise an ORP of between 10 mV to 200 mV.

12. The biosolids of claim 11, wherein the biosolids are Class A biosolids.

13. A method for the treatment of sewage sludge, comprising:

(a) applying an amount of ferrate to sewage sludge;
(b) mixing the ferrate and the sewage sludge;
(c) applying an amount of ferric chloride to the ferrate and sewage sludge mixture;
(d) mixing the ferric chloride and the ferrate and sewage sludge mixture;
(e) separating the ferrate, ferric chloride and sewage sludge mixture into its liquid components and its solid components;
(f) collecting the solid components; and
(g) drying the solid components;

wherein the amount of applied ferrate and applied ferric chloride is between about 1% and about 10% of the total solids content of the sewage sludge; and wherein the steps of mixing the ferrate and sewage sludge and mixing the ferric chloride and the ferrate and sewage sludge mixture are conducted at a pH of 6.5 to 8.5 such that the iron-containing compound produces ferric hydroxide.

14. The method of claim 13, wherein the amount of ferrate is between about 1% and about 5% of the total solids content of the sewage sludge.

15. The method of claim 14, wherein the amount of ferrate is about 1.5% of the total solids content of the sewage sludge.

16. The method of claim 13, wherein the amount of ferric chloride is between about 1% and about 10% of the total solids content of the sewage sludge.

17. The method of claim 16, wherein the amount of ferric chloride is about 1.8 to about 2.3% of the total solids content of the sewage sludge.

18. The method of claim 13, wherein the sewage sludge is thickened prior to the addition of the ferrate.

19. The method of claim 18, wherein the sewage sludge is thickened to about 5% solids content.

20. The method of claim 19, wherein the ferrate, ferric chloride and sewage sludge mixture is separated using a centrifuge.

21. The method of claim 13, wherein the separated solids are dried using an application of heat.

22. The method of claim 21, wherein the separated solids are dried using an application of heat of about 80° C.

23. The method of claim 13, wherein the ferrate and the ferric chloride are applied within about zero to 30 minutes of each other.

24. The method of claim 23, wherein the ferrate and the ferric chloride are applied simultaneously.

25. The method of claim 24, wherein the ratio of ferric chloride to ferrate is between about 5:1 and 30:1.

26. The method of claim 25, wherein the ratio of ferric chloride to ferrate is between about 10:1 and 30:1.

27. The method of claim 26, wherein the ratio of ferric chloride to ferrate is between about 20:1 and 30:1.

* * * * *